United States Patent Office 3,526,766
Patented Sept. 1, 1970

3,526,766
ADJUSTABLE POLE-SHOE LENS ASSEMBLY FOR CORPUSCULAR RAY DEVICES AND METHOD FOR ADJUSTING THE SAME
Wolfgang Dieter Riecke, Berlin, Germany, assignor to Max-Planck-Gesellschaft zur Forderung der Wissenschaften e.V., Gottingen, Germany
Filed July 27, 1967, Ser. No. 656,401
Claims priority, application Germany, Feb. 24, 1967, M 72,884
Int. Cl. H01j 37/26
U.S. Cl. 250—49.5
16 Claims

ABSTRACT OF THE DISCLOSURE

A pole-shoe lens unit adapted to be inserted into and removed from the hollow evacuated interior of a corpuscular ray device, such as an electron microscope. The unit includes a pair of pole-shoe means and a spacer means which is non-magnetic and which is situated between and connected with the pair of pole-shoe means to determine the positions thereof with respect to each other. At least one of the pole-shoe means is transversely adjustable with respect to the other and is capable of being maintained in its adjusted position by screws which extend parallel to the ray axis. The adjusted position of the one adjustable pole-shoe means is maintained exclusively by these screws, so that there are no adjusting screws which exert on the one adjustable pole-shoe means any force which extends transversely with respect to the ray axis. The pair of pole-shoe means together with the spacer means define a hollow interior space for the unit, and within this latter space is situated at least one additional component which can be removed from and inserted into the corpuscular ray device together with the pole-shoe unit. This one additional component may be a stigmator means, a diaphragm means, or a transversely adjustable object stage, and in fact all of the three latter means can be accommodated in the space within the unit. The method for adjusting the one adjustable pole-shoe means includes the taking of a test photograph while the unit is in the corpuscular ray device, so that this photograph will indicate the required adjustment, the removal of the unit from the corpuscular ray device, and then the actual adjustment of the one pole-shoe means, this adjustment being carried out manually while using an optical enlarging device which utilizes light rays.

---

My invention relates to corpuscular ray devices and in particular to pole-shoe lens assemblies for such devices, these assemblies being magnetic, particularly electromagnetic, and the pole-shoe assembly has a pair of pole-shoes spaced from each other by a non-magnetic spacer.

The pair of pole-shoes and the spacer situated between and connected thereto form an isolated unit which can be removed from and inserted into the corpuscular ray device, and at least one of the pole-shoes can be adjusted with respect to the other in a direction transversely of the corpuscular ray axis after the unit has been removed from the corpuscular ray device.

While structures of the above type are to be used primarily with electron microscopes, as pole-shoe lens assemblies therefor, it is also possible to use the structure of my invention with advantage in ion microscopes, devices for working with charge-carrying rays, diffraction devices, or other types of corpuscular ray devices.

Pole-shoe lens assemblies wherein both of the pole-shoes form part of an independent unit which can be removed from the corpuscular ray device are already known and described, for example, in U.S. Pat. 2,679,018. The device disclosed in this latter patent also includes a unit which is, without influencing the position of the components of the lens which generate the magnetic flux, such as, for example, a coil with an iron return flow member or permanent magnet, also removable from the interior of the corpuscular ray device, and which includes means for bringing about a relative movement between both of the pole-shoes transversely with respect to the ray axis. This latter adjustment at the exterior of the corpuscular ray device has the advantage of not requiring the movement of the individual pole-shoes to take place under the influence of a magnetic flux and of not requiring any friction-reducing gap between the individual components of the unit. When the pole-shoe is in its inserted position in the corpuscular ray device surrounded by the flux-generating components of the lens, it is particularly difficult to apply drives or tools for the purpose of adjusting the pole-shoe at the pole-shoe assembly.

With known pole-shoe lens assemblies, the non-magnetic spacer component has a hollow cylindrical part which receives the lower pole-shoe and onto which the upper pole-shoe is set by means of a circular extension which extends into the spacer. In order to hold both of the pole-shoes as well as to carry out their adjusting movements, a plurality of screws are provided in the hollow cylindrical component of the spacer extending transversely with respect to the ray axis and having ends which extend into openings of the pole-shoes. During the adjustment of the individual pole-shoes, these circumferentially distributed screws serve partly as pressure screws for bringing out adjusting movements and partly as counter screws. Experience has shown that on the one hand it is very difficult to adjust the different screws which act on a pole-shoe in such a way that they will exert uniform forces on the pole-shoe and that on the other hand when the individual screws exert different forces there are compensating movements of the particular pole-shoe relative to the other pole-shoe after the adjusting movements have been terminated. This factor can be considered as a type of mechanical hysteresis. Furthermore, the points at which the individual screws act is not precisely determined with respect to the manufacturing tolerances, so that the individual screws can exert different turning moments on the particular pole-shoe depending upon the positions of the screws, and thus the accuracy of the adjustment is also reduced. Thus, there are in principle, with holding and adjusting screws of this type which act on the pole-shoe assembly transversely with respect to the ray axis, a pair of sources of error which reduce the quality of the adjustment, one of these sources of error being that which was described above in connection with the compensating movements which take place after the adjustment has been completed and the other being the reduction in accuracy which takes place during the adjustment.

It is accordingly a primary object of my invention to provide a pole-shoe lens assembly which will avoid the above drawbacks.

In particular, it is an object of my invention to provide a pole-shoe lens assembly which does not have any components which will exert any forces on a pole-shoe in a direction which extends transversely with respect to the ray axis.

In addition, it is an object of my invention to provide a construction according to which it is possible to adjustably fix one pole-shoe with respect to the other in a manner which will provide a minimum of friction with respect to the adjustable movement of the adjusted pole-shoe.

Also, it is an object of my invention to provide a construction according to which it becomes possible to situate in the interior of the pole-shoe unit additional components such as a stigmator, a diaphragm means, and/or an object stage which is adjustable transversely with respect to the ray axis, any one or all of these components being removable with the unit from the interior of the corpuscular ray device and insertable into the latter device with the unit.

Furthermore, the objects of my invention include the provision of a method according to which it is possible, in an extremely convenient manner, to carry out the required adjustment of the pole-shoe in a highly accurate manner.

In accordance with my invention, the pole-shoe lens assembly includes a pair of pole-shoe means and a spacer means situated between and connected with the pair of pole-shoe means to determine the position thereof with respect to each other. This spacer means has a friction surface which extends transversely with respect to the ray axis and which serves as a surface to be engaged by the adjustable pole-shoe means. In order to press the adjustable pole-shoe means against this friction surface a plurality of screws which extend parallel to the ray axis are provided, these screws being threaded into the spacer means, which is non-magnetic, while these screws extend with clearance through openings which are formed in the pole-shoe means. Between the heads of the screws and the surface of the pole-shoe means directed toward these heads is situated an antifriction means.

Thus, with the structure of my invention, the adjustable pole-shoe is connected with the nonmagnetic spacer only by screws which extend parallel to the ray axis, and the entire unit is constructed in such a way, using additional components which eliminate transverse friction, that after the adjustable pole-shoe component has been adjusted there will be no force components acting transversely with respect to the ray axis.

The determination of the adjusted position of the adjustable pole-shoe is brought about by tightening the screws which extend parallel to the ray axis so as to increase the friction between the adjustable pole-shoe, or a ring which carries the latter, on the one hand, and a surface of the non-magnetic spacer which is engaged by the latter ring of the pole-shoe. This tightening of the screws is carried out to such an extent that the adjustable pole-shoe will be reliably fixed in its adjusted position. Thus, with this construction there are no screws which extend transversely with respect to the ray axis.

In order that upon tightening of the screws there will be after the adjusting movement no transverse forces acting on the adjustable pole-shoe so as to bring about transverse displacement thereof either immediately or after passage of time, additional measures are taken, in accordance with my invention, in order to reduce the friction between the heads of the screws, on the one hand, and the surface of the adjustable pole-shoe which is directed toward the screw heads, or between a ring which is fixed to the pole-shoe and which has a surface directed toward the screw heads on the other hand. The friction is reduced in accordance with my invention to a negligible value. Thus, opposite measures are taken at opposite surfaces. The surface of the spacer means against which the adjustable pole-shoe means is pressed is a friction surface for reliably maintaining the adjusted pole-shoe in its adjusted position by means of the friction at this surface, while on the other hand, the heads of the screws act with as little friction as possible on the surfaces toward which they are pressed.

My invention is illustrated by way of example in the accompanying drawings in which.

Figure 2:
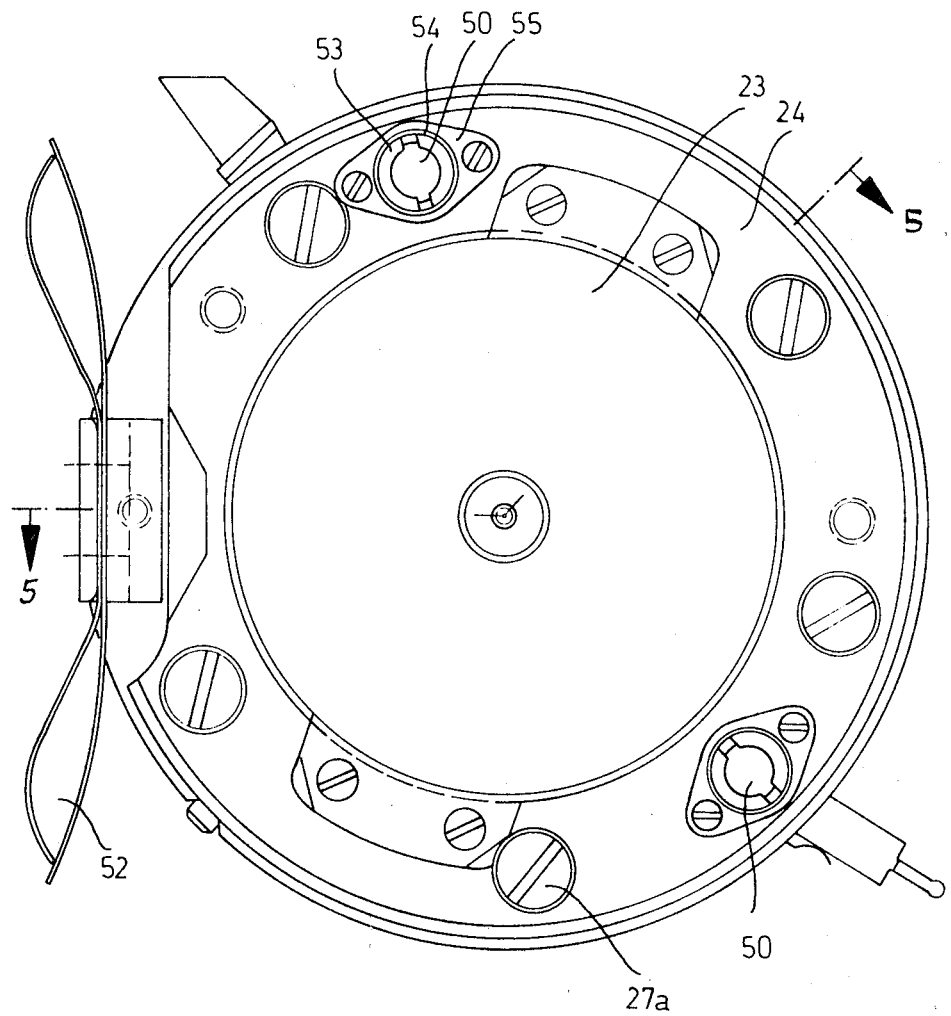
FIG. 2 is a top plan view of a pole-shoe lens unit of my invention which has features in addition to those of the unit of FIG. 1.
Figure 3:
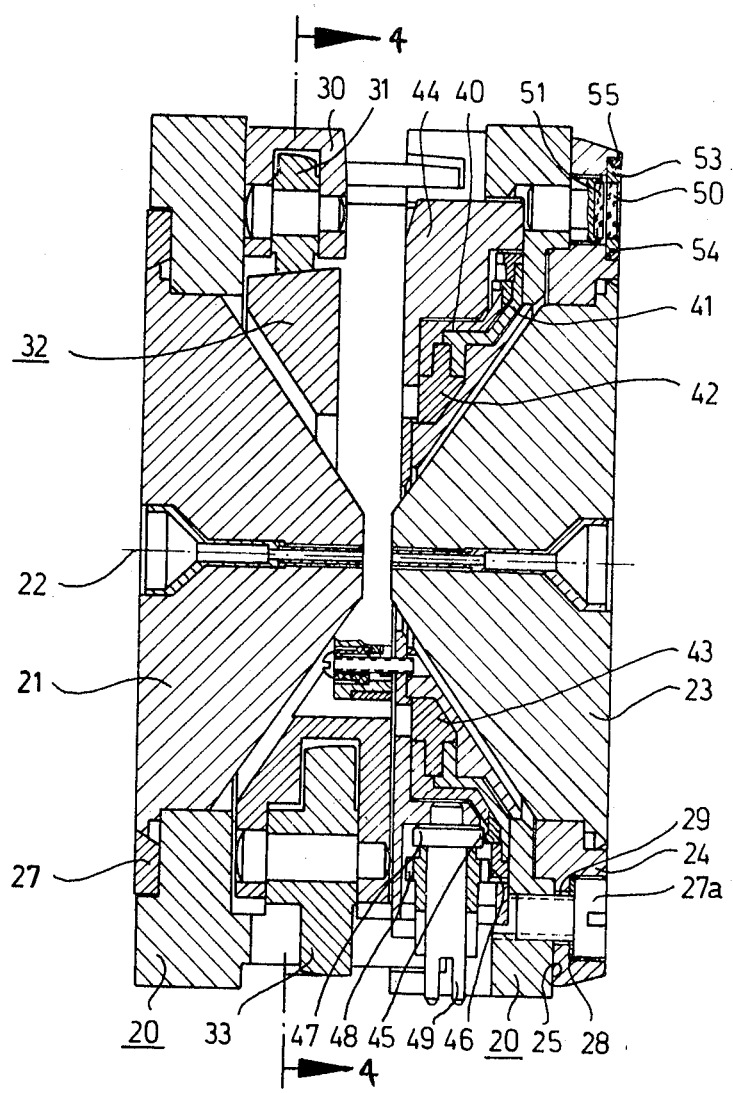
FIG. 3 is a transverse section of the structure of FIG. 2 taken along line 3—3 of FIG. 4 in the direction of the arrows.
Figure 4:
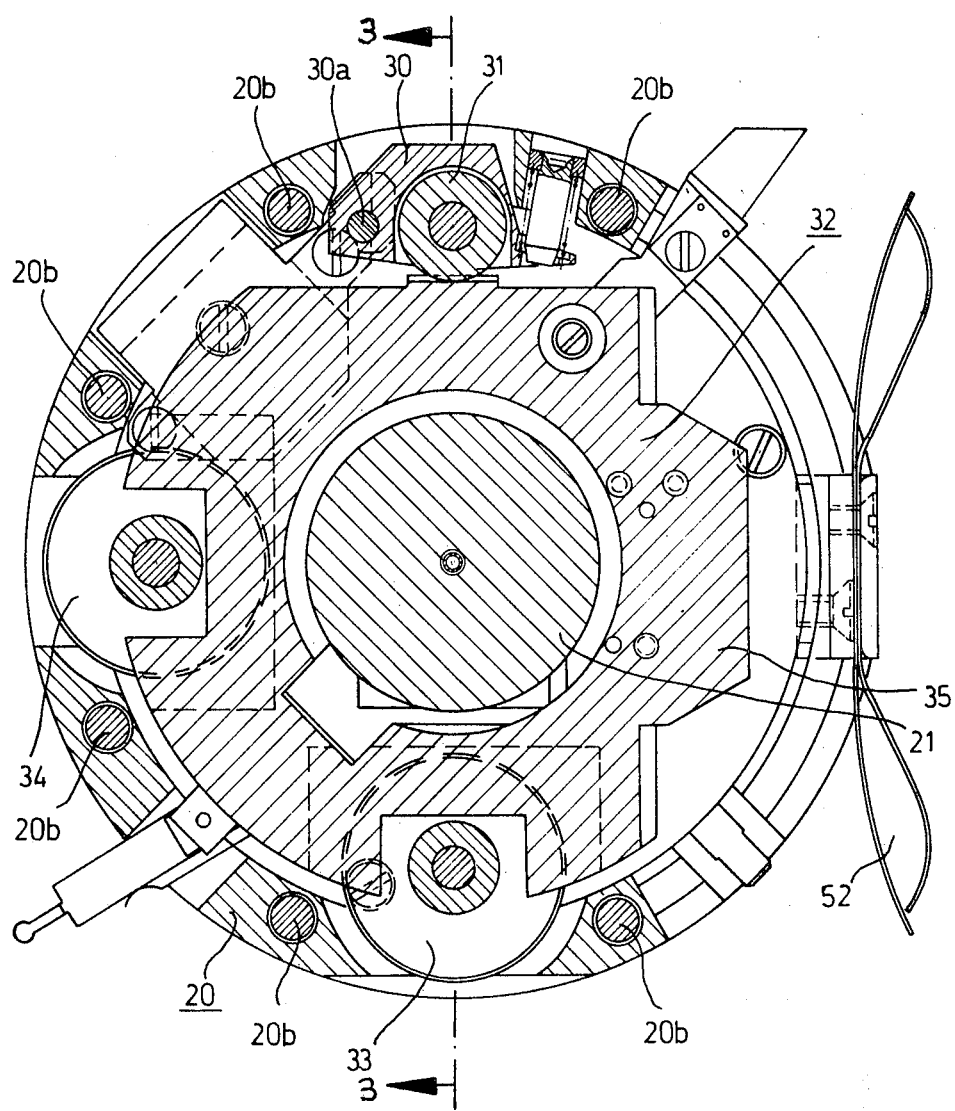
Figure 5:
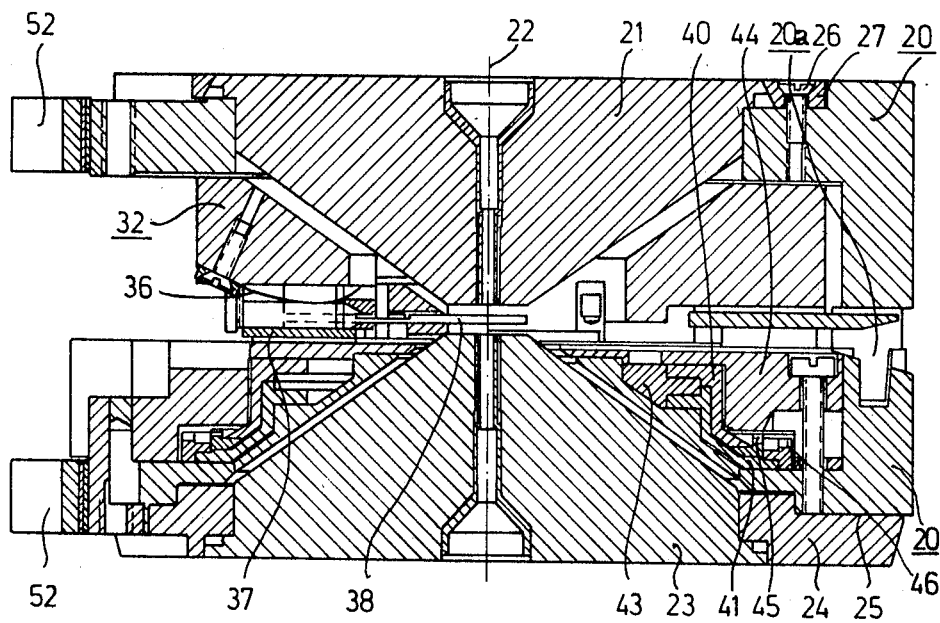

FIG. 4 is a sectional plan view of the structure of FIGS. 2 and 3 taken along line 4—4 of FIG. 3 in the direction of the arrows; and FIG. 5 is a transverse section of the structure of FIG. 2 taken along line 5—5 of FIG. 2 in the direction of the arrows.

Figure 1:
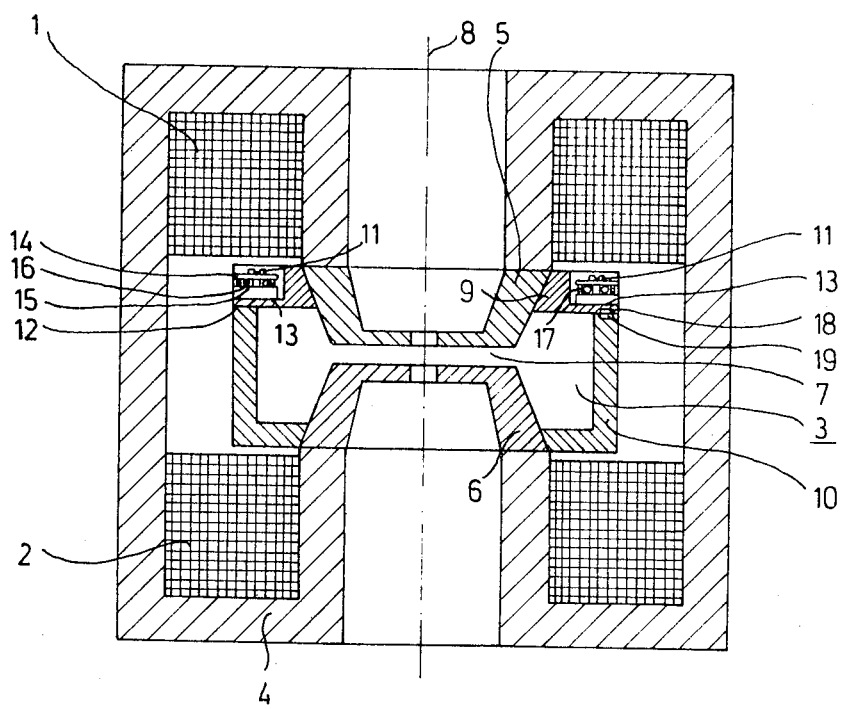
FIG. 1 is a schematic longitudinal sectional elevation of a pole-shoe lens assembly of my invention, the section of FIG. 1 being taken in a vertical plane which contains the ray axis.

FIG. 1 schematically illustrates the principle of my invention. FIG. 1 illustrates a pole-shoe lens which is provided above and below the pole-shoe unit 3 with the windings 1 and 2 for generating the magnetic flux, the structure also including an iron flux-return flow component 4. The flux which flows in the iron-member 4 is received in the pole-shoes 5 and 6 and flows across the lens gap 7 situated therebetween, the control of the electron ray 8 being brought about by the magnetic flux within the lens gap 7. The pole-shoe means 5 includes a non-magnetic ring 9 which directly carries the pole-shoe and which is made, for example, of brass, and the spacer means 10 of the unit 3 is also made of a non-magnetic material such as brass, this spacer means 10 being directly fixed to the non-adjustable pole-shoe means 6, and the pair of pole-shoe means 5 and 6 together with the spacer means 10 are combined to form the unit 3. This unit is separately and independently removable out of the corpuscular ray device in the illustrated example by displacement transversely with respect to the electron ray axis 8. For this purpose the iron ring 4 is formed in the region of the unit 3 with an opening through which the latter may be introduced into and removed from the operating position indicated in FIG. 1.

The pole-shoe 5 is adjustable transversely with respect to the electron ray axis 8 and with respect to the other pole-shoe 6 which is fixed to the spacer component 10, and this pole-shoe 5 is fixed to the ring 9 which forms part of the upper pole-shoe means of FIG. 1. This ring 9 is pressed against the surface 12 of the spacer means 10 by means of screws 11 which are uniformly distributed circumferentially about the electron ray axis 8. The surface 12 is a friction surface in that it is roughened, but the extent of roughness is limited so that when the screws 11 are loosened fine adjusting movements of the ring 9 and thus of the pole-shoe 5 transversely with respect to the ray axis 8 can be carried out.

While the surface 12 is thus formed as a friction surface, there are additional means between the lower surfaces of the heads of the screws 11, on the one hand, and the surfaces 13 of the upper pole-shoe means directed toward the screw heads, on the other hand, to eliminate any friction between the screw heads and these upwardy directed surface regions 13 during tightening of the screws 11. In the illustrated example the surfaces 13 form the lower surfaces of recesses which are formed in and extend downwardly into the ring 9 of the upper pole-shoe means of FIG. 1. In the example of FIG. 1 the antifriction means situated between the surface 13 and the lower surface of each screw head includes a ball bearing means composed of a pair of spaced washers or plates 14 and 15 through which each screw 11 passes with the upper washer 14 engaging the lower surface of each screw head, and between the spaced washers 14 and 15 are situated the ball members 16 of each ball bearing. Each ball bearing furthermore is held by a yieldable cage means 17 made, for example, of a foamed plastic and surrounding each ball bearing. Thus, the ball members of each ball bearing are held in such a way that all transverse forces which would otherwise be encountered during tightening of the screws if the parts 14–16 were not present at the ring 9, are eliminated and rendered ineffective.

In order to permit the desired adjusting movement of the pole-shoe means 5 to take place, the screws 11 extend through openings of the ring 9 with a clearance or play which is sufficiently great to provide for the required extent of adjustment.

The components 9 and 10 respectively carry scales 18 and 19 which form an indicating means for indicating the adjusted position of the pole-shoe means 5, once this adjusted position has been achieved.

As is apparent from the above description of the example of FIG. 1, there are no screws which extend transversely or at an incline to the direction with respect to the ray axis, and in addition the screws 11 serve only as holding screws and not as adjusting screws. Experience has shown that a very fine adjustment without any adjusting screws can be carried out at the exterior of the corpuscular ray device in a manual manner for example by carefully tapping the adjustable pole-shoe with a pencil. In accordance with my invention, a preferred method for adjusting the pole-shoe lens includes the steps of making a test photograph when the unit 3 is in the corpuscular ray device and deriving from this photograph the adjusting movements required for the adjustable pole-shoe. The unit 3 is then removed from the corpuscular ray device, and then while observing the adjusting movements by means of an optical magnifying device, using light rays, the required adjustment is carried out manually.

It should be noted, however, that it is also possible to use a device into which the unit 3 is inserted after it is removed from the corpuscular ray device for the purpose of carrying out the adjustments, and in some cases this device into which the unit at the exterior of the corpuscular ray device is inserted may be provided with adjusting screws.

The antifriction means which in the case of FIG. 1 includes the ball members can also take the form of washers having smooth exterior surfaces and made, for example, of a suitable plastic.

A further advantage which resides in combining the elements of the pole-shoes of the lens into an independent unit which is separately removable from the corpuscular ray device resides in the simple possibility of cleaning and exchanging the pole-shoes. Insofar as it is necessary, for example, to disassemble the unit for these purposes, it is of advantage to provide for the adjustable pole-shoe preferably adjustable indicating means such as suitable marks in the form of cross hairs, for example, in order to indicate the properly adjusted position of the adjustable pole-shoe. When using an adjustable indicating means of this type, it is possible to bring parts of a mark carried by a pair of relatively movable elements into registry after the adjustment, so that when the unit is again assembled the adjustment which was achieved before the disassembly can be again made with a high degree of accuracy, so that in this case it is not necessary to make a new test photograph.

Inasmuch as there is with the pole-shoe lens of my invention a complete elimination of any screws in the unit which extend transversely or in an inclined direction with respect to the corpuscular rays, it is unnecessary to provide any circular extensions of the like at the adjustable pole-shoe which would otherwise be required to extend into the space between the pole-shoes in the interior of the unit in order to accommodate such screws which extend transversely or in an inclined direction with respect to the ray axis. Therefore, the construction of my invention makes it possible to provide in the free space which is defined in the interior of the unit by the pair of pole-shoe means and the spacer means additional lens components which can form part of the unit which is independently removable from the corpuscular ray device. It is to be noted that this possibility can also be provided under circumstances where the fixing of the adjustable pole-shoe takes place in a manner different from that indicated above, but on the other hand this highly advantageous possibility of situating additional lens components in the interior of the pole-shoe unit of my invention is especially present with the pole-shoe fixing structure of my invention because the use of holding screws which extend only parallel to the ray axis does not require any additional parts, collars, rings, or the like.

The type of additional components which will be situated in the interior of the pole-shoe unit, in accordance with my invention, are preferably components which require an adjustment with respect to the corpuscular ray or which must be moved with respect to the corpuscular ray during operation of the corpuscular ray device. For example, these additional components may include a stigmator. If the stigmator is of an electrical or electromagnetic type, then the adjustment of the latter transversely with respect to the corpuscular ray is of primary importance as long as the stigmator axis is not directed with respect to the lens axis in an electrical manner. It is possible also to provide a mechanical stigmator which is fixed by means of a stigmator housing to the spacer means and/or to a pole-shoe which is fixed to the spacer means. With a mechanical stigmator means of this type, the adjustment is brought about in a known manner by movement of magnetic non-symmetrical bodies (iron masses) with respect to the corpuscular ray. A stigmator means of this latter type can be connected with a screw driver type of connection, for example, to a drive which extends in a vacuum-tight manner through the housing of the corpuscular ray device, so that in a simple manner the possibility of releasing this latter connection when the unit is removed is provided.

The components which are accommodated in the interior of the unit can also take the form of diaphragms, in some cases of the type which are in thermal connection with a cryostatic refrigerating medium, such as liquefied air. Diaphragms which are cooled in this manner are of particular significance with objective lenses where there are arranged in the space surrounding the object which is being investigated cooled surfaces for the purpose of avoiding object contamination.

Also in the case of an objective lens the additional components situated in the interior of the unit can include an object stage which is shiftable transversely with respect to the ray axis.

FIGS. 2–5 illustrate an example of my invention according to which the pole-shoe unit accommodates in its interior an object stage as well as a known mechanical stigmator means. Thus, this construction provides a unit which can be introduced into an objective lens of an electron microscope, for example. The flux-generating components of the objective lens, which in the case of an electromagnetic lens take the form of lens windings and an iron-return flow member, are not illustrated. They are known and conform in principle to the structure illustrated in FIG. 1.

The unit of FIGS. 2–5 includes the lower pole-shoe means 21 which is fixed with the two-part non-magnetic spacer means 20 as well as the upper pole-shoe means 23 which is adjustable transversely with respect to the ray axis 22 and which is fixed in a ring 24 which surrounds the upper pole-shoe proper, this ring 24 engaging the supporting surface 25 of the spacer means 20. This surface 25 is a friction surface, as described above in connection with the embodiment of FIG. 1. The upper and lower parts of the spacer means 20 are interconnected, as shown in FIG. 5, with a tapered fit 20a one in the other, and the components are fixed to each other by means of screws 20b indicated in FIG. 4. The periphery of the spacer means 20 has a rib-like configuration, as is also apparent from FIG. 4.

The fixed connection between the lower pole-shoe means 21 and the spacer means 20 is provided, as shown in FIG. 5, by way of screws 26 and a ring 27 of tapered cross section. While in this case the connection is brought about by the fitting together of components of matching configurations, the upper pole-shoe means 23 is held on the spacer means 20 only by the force exerted through the ring 24. For this purpose the screws 27a are provided, and these screws are suitably tightened so as to increase the force of friction between the parts 24 and 20 where they press against each other at the friction surface 25 to an extent required for reliably fixing the upper pole-shoe means 23.

In order that there will be no force components directed transversely with respect to the electron ray 22 during tightening of the screws 27a, of which there are a plurality circumferentially distributed uniformly about the ray axis 22, so as to prevent transmission of such transverse force components to the adjustable pole-shoe, washers 28 (FIG. 3) form an antifriction means and are made of a friction-reducing material, these washers being situated between the heads of the screws 27a and the surfaces of the ring 24 directed toward the screw heads. In the illustrated example the washers 28 are made of a suitable plastic and have smooth exterior surfaces. The screws 27a extend through openings 29 in the ring 24 of the upper pole-shoe means, and these screws have in the openings 29, respectively, a clearance which is sufficiently great so that the openings 29 do not prevent the required adjusting movements of the upper pole-shoe means 23 from being carried out.

The spacer means 20 fixedly carries a pin 30a (FIG. 4) which serves to support for rotary movement with respect to the spacer means 20 the holder 30 for a tapered roller 31 which serves to maintain the object stage 32 in engagement with a stop surface. The object stage 32, which is of a generally ring-shaped configuration, as shown in FIG. 4, carries at its side which is directed away from the spring-pressed tapered roll 31 a further roll 33 which is engaged by an unillustrated adjusting device for the object stage 32 when the entire unit is situated in the interior of the corpuscular ray device. The same purpose is served by a third roll 34 which is rotatably carried by the object stage which is engaged by a springy member at its region 35 which is directed away from the roll 34.

The object stage 32 carries, as is illustrated only in FIG. 5, in a chamber 37 which is provided with a spring 36 the object holder 38 itself, this object holder having a diaphragm-type of configuration at its region which is situated at the electron ray axis 22, and in this diaphragm the object which is to be investigated is held.

Furthermore, the unit has a mechanical stigmator which may have a construction of the type shown in German Pat. 927,525. This stigmator includes the pair of rings 40 and 41 which are turnable one relative to the other and each of which carries a predetermined number of iron blocks which act as non-symmetrical bodies. Only the pair of diametrically opposed non-symmetrical components 42 and 43 of the inner stigmator ring 41 are visible in FIGS. 3 and 5. The corresponding non-symmetrical bodies of the ring 40 are situated before and behind the components 42 and 43 also diametrically opposed to each other.

The pair of stigmator rings are held on the non-magnetic spacer means 20 by means of the stigmator housing 44. This housing also is made of a magnetically inactive material.

The drive for the stigmator is constructed so that on the one hand in order to adjust the intensity of the stigmator field the pair of rings 40 and 41 are moved to adjust the iron pieces, such as the bodies 42 and 43 carried thereby, with respect to each other and on the other hand in order to adjust the direction of the stigmator field by turning all of the bodies of non-symmetry in common about the ray axis 22. For this purpose the pair of stigmator rings carry, as shown in FIG. 3, circularly arranged gear teeth 45 and 46 forming annular gears which mesh with pinions 47 and 48 carried by the rotary member 49 shown most clearly in FIG. 3. This structure forms an adjusting means for the stigmator and the outer end of the rotary member 49 forms a connecting means having a screw driver type of connection. For this purpose the outer end of the component 49 is slotted and has a key-like configuration so as to be capable of being placed in connection with a suitable stigmator drive which will transmit rotary movement to the member 49.

In order to fix the adjusted position of the adjustable pole-shoe means 23, an indicating means is provided, and this indicating means includes, according to the structure shown in FIG. 3, a pair of glass plates 50 and 51 having cross hairs, one of these plates being fixed to the ring 24 of the upper pole-shoe means while the other is fixed to the spacer means 20. The plate 50 is transversely shiftable, so that the marks on both scales can be brought into registry after termination of the pole-shoe adjustment. The plate 50 is cemented into a ring 53 which is separated by a gap 54 (FIG. 2) from the apertured strap 55 which serves to maintain the ring 53 in position on the ring 24 by overlapping the periphery of the ring 53 in the manner shown most clearly in FIG. 3.

When the unit is positioned within the corpuscular ray device, it is held against a predetermined locating surface by means of the spring assembly 52.

I claim:

1. In a corpuscular ray device, means defining a travel path for a corpuscular ray, and a pole-shoe lens assembly removably insertable in said means, said assembly comprising a pair of magnetic pole-shoe means and non-magnetic spacer means situated between and connected with said pair of pole-shoe means for maintaining them spaced from each other, at least one of said pole-shoe means being transversely adjustable with respect to the other and said spacer means having a surface extending transversely with respect to a ray axis of the device and with respect to which said one adjustable pole-shoe means is movable, friction means disposed in said surface of said spacer means for facilitating the adjustment of said one pole shoe, a plurality of headed screw members extending through said one pole-shoe means and being connected with said spacer means for adjustably fixing said one pole-shoe means thereto at said friction means, said one pole-shoe means being formed with openings through which said screw members extend with clearance, and antifriction means situated between heads of said screw members and said one pole-shoe means for reducing friction between the heads of said screw members and said one pole-shoe means, all of said screw members extending parallel to said ray axis.

2. The combination of claim 1 and wherein said one pole-shoe means is fixed in its adjusted position solely by said screw members, so that there are no adjusting screws which can exert on said one pole-shoe means forces which are directed transversely with respect to the ray axis.

3. The combination of claim 1 and wherein said antifriction means includes washers situated beneath the heads of said screw members, respectively, and having smooth exterior surfaces.

4. The combination of claim 3 and wherein said washers are made of plastic.

5. The combination of claim 1 and wherein said antifriction means includes for each screw member a ball bearing assembly comprising a pair of spaced washers through which each screw member extends and a plurality of ball members situated between and engaging the spaced washers.

6. The combination of claim 5 and wherein a cage means of yieldable material holds each of said ball bearing assemblies.

7. The combination of claim 1 and wherein an indicating means coacts with said one pole-shoe means for indicating the adjusted position thereof.

8. The combination of claim 1 and wherein an ancillary component is disposed within said assembly, said pair of pole-shoe means and said spacer means coacting with each other to define a hollow interior space for accommodating said component.

9. The combination of claim 8 and wherein a stigmator means forms said additional component.

10. The combination of claim 9 and wherein said stigmator means is mechanical and includes a stigmator housing fixed to one of the other means which define the space which accommodates said stigmator means.

11. The combination of claim 10 and wherein a drive means coacts with said stigmator means for adjusting the latter, said drive means having accessible from the exterior of said unit a connecting means for connecting a transmission to said drive means.

12. The combination of claim 8 and wherein said additional component is a diaphragm means.

13. The combination of claim 12 and wherein a cryostatic refrigerating means is in thermal engagement with said diaphragm means.

14. The combination of claim 8 and wherein said additional component is an object stage means situated in said space for movement transversely with respect to the ray axis.

15. The combination of cliam 8 and wherein a plurality of components are situated in the interior of said unit, said plurality of components including a stigmator means, a diaphragm means, and an object stage means situated in said unit for movement transversely with respect to the ray axis.

16. A method for adjusting a pole-shoe lens unit which is adapted to be used in the interior of a corpuscular ray device and which includes a pair of pole-shoe means and a spacer means situated between and connected with said pair of pole-shoe means and with respect to which at least one of said pole-shoe means is adjustable, comprising the steps of making a test photograph of the unit when it is in the device so as to derive from said photograph the required adjustment for said one pole-shoe means, removing the unit from the device, and then manually adjusting said one pole-shoe means while observing the adjusting movement with an optical enlarging device which uses light rays.

References Cited

UNITED STATES PATENTS

| | | | |
|---|---|---|---|
| 2,352,043 | 6/1944 | Von Ardenne | 250—49.5 |
| 2,679,018 | 5/1954 | Reisner et al. | 313—84 |
| 2,819,403 | 1/1958 | Reisner | 250—49.5 |
| 2,939,955 | 6/1960 | Rommerts | 250—49.5 |
| 3,316,402 | 4/1967 | Schmidt et al. | 250—49.5 |
| 3,387,132 | 6/1968 | Herrmann et al. | 250—49.5 |

ARCHIE R. BORCHELT, Primary Examiner

C. E. CHURCH, Assistant Examiner